US008155424B2

(12) United States Patent
Takahashi

(10) Patent No.: US 8,155,424 B2
(45) Date of Patent: Apr. 10, 2012

(54) COIN DETECTING APPARATUS

(75) Inventor: Masataka Takahashi, Matsudo (JP)

(73) Assignee: Laurel Precision Machines Co., Ltd., Osaka (JP)

( * ) Notice: Subject to any disclaimer, the term of this patent is extended or adjusted under 35 U.S.C. 154(b) by 1176 days.

(21) Appl. No.: 11/507,583

(22) Filed: Aug. 22, 2006

(65) Prior Publication Data

US 2007/0047795 A1 Mar. 1, 2007

(30) Foreign Application Priority Data

Aug. 24, 2005 (JP) ................................ 2005-242560

(51) Int. Cl.
*G06K 9/00* (2006.01)

(52) U.S. Cl. .................................. 382/136; 359/487.04

(58) Field of Classification Search .................. 382/136; 902/7; 73/163; 359/487.04, 489.08, 618, 359/629, 634
See application file for complete search history.

(56) References Cited

U.S. PATENT DOCUMENTS 3,643,771 A * 2/1972 Takebe .......................... 400/134
3,844,658 A * 10/1974 Gela et al. .................... 356/4.04
4,562,344 A * 12/1985 Mihara et al. .............. 250/201.4
4,589,140 A * 5/1986 Bishop et al. ................. 382/148
5,033,099 A * 7/1991 Yamada et al. ............... 382/197
5,220,614 A * 6/1993 Crain ............................ 382/136
5,576,825 A 11/1996 Nakajima et al.
5,671,080 A * 9/1997 Mihara ...................... 359/210.1
6,366,899 B1 * 4/2002 Kernz .................................. 1/1
6,688,449 B1 2/2004 Yamagishi
7,197,173 B2 * 3/2007 Jones et al. ................... 382/135
2006/0092505 A1 * 5/2006 Abnet et al. ................. 359/380

FOREIGN PATENT DOCUMENTS

JP 06150104 A * 5/1994
JP 9-97363 4/1997
JP 10-208021 8/1998
JP 2003-233851 8/2003
TW 540718 7/2003
WO WO 2004/075124 A 9/2004

OTHER PUBLICATIONS

Machine translation of JP 09-097363:Taniguchi.*
Machine translation of JP 10-208021 A, 8 total pages.*
Machine translation of JP 06-150104 A, 7 total pages.*
Japanese Office Action and English Translation for copending Japanese Application No. 2005-242560, mailed Mar. 2, 2010, 4 pages.

* cited by examiner

*Primary Examiner* — Matthew Bella
*Assistant Examiner* — Dennis Rosario
(74) *Attorney, Agent, or Firm* — Nixon & Vanderhye P.C.

(57) ABSTRACT

A coin detecting apparatus has: a light source for emitting a light beam onto either of two surfaces of a coin; a half mirror for splitting the light beam reflected on the surface of the coin into a transmitted light beam and a reflected light beam; a full area sensor for obtaining a full image of the surface of the coin in accordance with one of the transmitted light beam and the reflected light beam; and a regional area sensor for obtaining a partial image of the surface of the coin in accordance with the other one of the transmitted light beam and the reflected light beam. By doing this, it is possible to provide a coin detecting apparatus capable of improving accuracy in coin detection and shortening time therein.

8 Claims, 1 Drawing Sheet

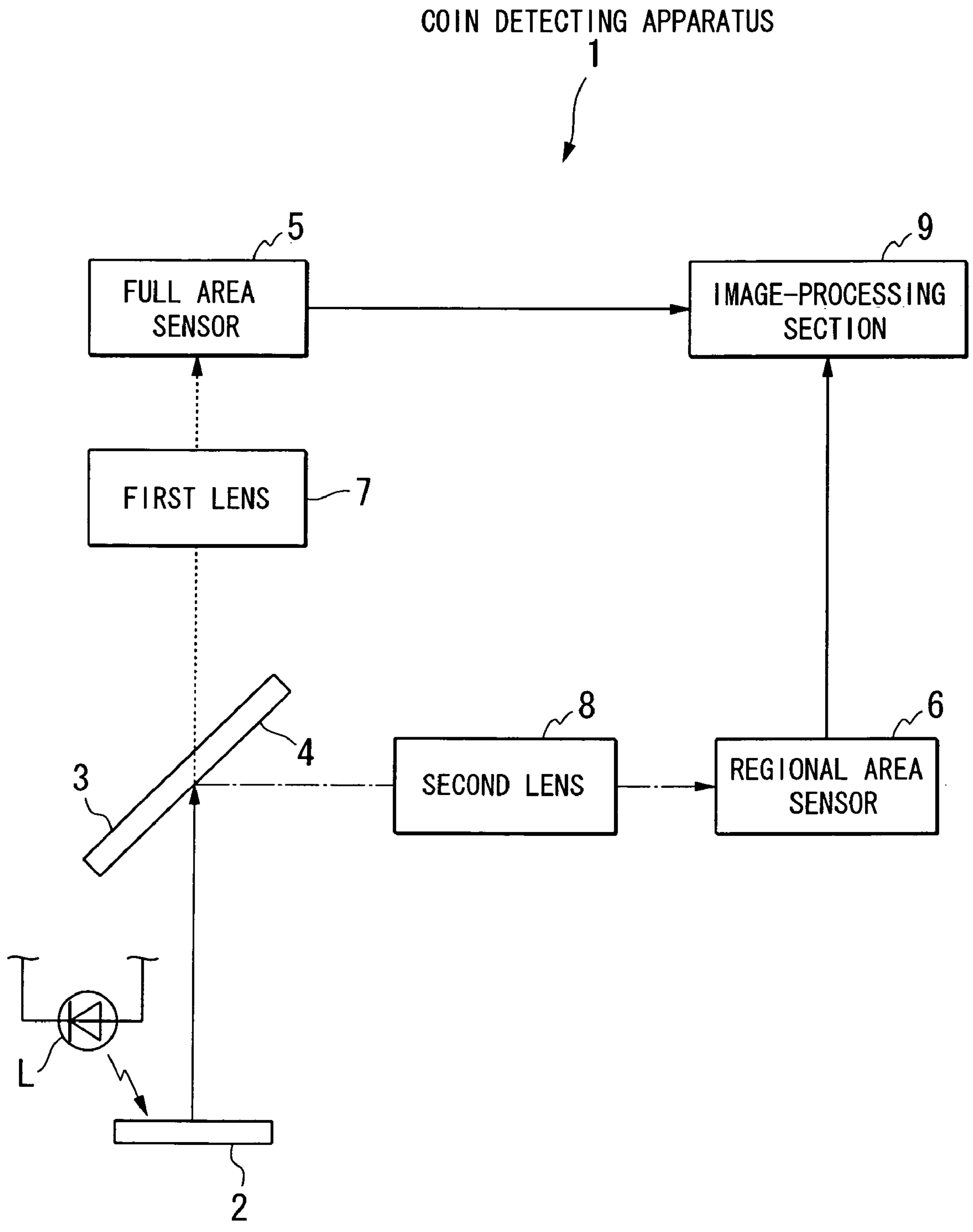
COIN DETECTING APPARATUS
1
5
FULL AREA SENSOR
9
IMAGE-PROCESSING SECTION
FIRST LENS
7
3
4
8
SECOND LENS
6
REGIONAL AREA SENSOR
L
2

COIN DETECTING APPARATUS

The present application is based on patent application No. 2005-242560 filed in Japan on Aug. 24, 2005, the content of which is incorporated herein by reference.

BACKGROUND OF THE INVENTION

1. Field of the Invention

The present invention relates to a coin detecting apparatus for identifying coins.

2. Description of the Related Art

Conventionally, a coin detecting apparatus is known for identifying coins, e.g., as to whether they are forged and what type they are, in accordance with captured results of the surface of the coin. In such coin detecting apparatuses, pre-processing of a pattern image conducted before identifying the coins is time-consuming because features of pressed pattern for indicating the density of the pattern image formed on the coin must be pre-processed using a complex image processing method. Therefore, in order to shorten the pre-processing time, a coin detecting apparatus has been proposed recently in which light beams having different wavelengths are reflected on a surface of a coin; and images of the surface of the coin are obtained with respect to each reflected light beam. (See, e.g., Japanese Unexamined Patent Application, First Publication No. H9-97363)

In the above coin detecting apparatus, more accurate identification is desirable. With respect to obtaining images, although finer patterns, e.g., slight patterns pressed on the coin can be obtained with high resolution, there is a problem in that the volume of data of the obtained pattern image will inevitably increase.

In addition, the increased volume of data may be more time-consuming with respect to data handling, e.g., data transmission, data-writing, and the image processing task.

SUMMARY OF THE INVENTION

It is an object of the present invention to provide a coin detecting apparatus capable of improving the accuracy of coin detection and shortening the time required therefor.

In order to achieve the above object, a first aspect of the present invention provides a coin detecting apparatus which includes: a light source (i.e., a light source L in an embodiment) for emitting a light beam onto either of two surfaces of a coin (i.e., a coin 2 in the embodiment); a half mirror (i.e., a half mirror 3 in the embodiment) for splitting the light beam reflected on the surface of the coin into a transmitted light beam and a reflected light beam; a first image-capturing section (i.e., a full area sensor 5 in the embodiment) for obtaining a full image of the surface of the coin in accordance with one of the transmitted light beam and the reflected light beam; and a second image-capturing section (i.e., a regional area sensor 6 in the embodiment) for obtaining a partial image of the surface of the coin in accordance with the other one of the transmitted light beam and the reflected light beam.

By this configuration, the light beam reflected on one of the surfaces on the coin is split by the half mirror; and the split light beams are input into the first image-capturing section and the second image-capturing section. Therefore, the full image of the surface of the coin and the partial image of the surface of the coin can be obtained simultaneously.

In a second aspect of the present invention, the second image-capturing section may be a high resolution image-capturing element.

By this configuration, while the full image of the surface of the coin can be obtained by the first image-capturing section, an image having high resolution of a partial surface of the coin can be obtained by the second image-capturing section.

In a third aspect of the present invention, the coin detecting apparatus may further include a lens disposed between the half mirror and the second image-capturing section.

By this configuration, while the full image of the surface of the coin can be obtained by the first image-capturing section, a magnified image of the surface of the coin can be obtained by the second image-capturing section.

In a fourth aspect of the present invention, the image obtained by the second image-capturing section may be an image of a central portion of the surface of the coin.

By this configuration, a reference image, i.e., a master image to be compared with the image of the central portion of the coin captured by the second image-capturing section, can be a central portion of a coin. Therefore, a plurality of reference images in accordance with arbitrary rotation angles of the coin may not be necessary, i.e., the reference image corresponding to a central portion of a coin can be compared with the captured image by rotating the reference image in accordance with the rotation angle of the captured coin.

In a fifth aspect of the present invention, the coin detecting apparatus may further include an image-processing section (i.e., an image-processing section 9 in the embodiment) for carrying out parallel-image processing with respect to the images obtained by the first image-capturing section and the second image-capturing section.

By this configuration, parallel comparisons can be carried out, i.e., the full image of one of two surfaces of the coin obtained by the first image-capturing section can be compared with a full image of one of two surfaces of a coin prepared for reference; and the part of one of two surfaces of the coin obtained by the second image-capturing section can be compared with a part of image of one of two surfaces of the prepared reference coins.

In accordance with the first aspect of the present invention, since the light beam reflected on the surface of the coin is split by the half mirror; the split light beams are input into the first image-capturing section and the second image-capturing section; thus, both the full image of the surface of the coin and the partial image of the surface of the coin can be obtained. Therefore, there is an effect in that, data size of the image can be reduced because the data handled in this aspect of the present invention is partial; thus, it is possible to shorten the identification time compared with a case in which the full image of the surface of the coin captured by the first image-capturing section is compared with the full image of the surface of the coin captured by the second image-capturing section.

In the second aspect of the present invention, an image having high resolution of a partial surface of the coin can be obtained by the second image-capturing section while the full image of the surface of the coin can be obtained by the first image-capturing section. Therefore, images having a finer pressed pattern formed on the surface of the coin can be detected; and there is an effect that detection accuracy may be improved.

In the third aspect of the present invention, a magnified image of the surface of the coin can be obtained by the second image-capturing section while the full image of the surface of the coin can be obtained by the first image-capturing section. Therefore, images having a finer pressed pattern formed on the surface of the coin can be detected; and there is an effect that the detection accuracy may be improved.

In the fourth aspect of the present invention, a reference image, i.e., a master image to compare with the image of the central portion of the coin captured by the second image-capturing section can be a central portion of a coin. Therefore, a plurality of reference images in accordance with arbitrary rotation angles of the coin may not be necessary, i.e., the reference image corresponding to a central portion of a coin can be compared with the captured image by rotating the reference image in accordance with the rotation angle of the captured coin. Therefore, there is an effect in that the number of reference images to be compared with the image captured by the second image-capturing section can be reduced.

In the fifth aspect of the present invention, parallel comparisons can be carried out, i.e., while the full image of one of two surfaces of the coin obtained by the first image-capturing section is compared with a full image of one of two surfaces of a coin prepared for reference, the partial image of one of two surfaces of the coin obtained by the second image-capturing section can be compared with the partial image of one of the prepared reference coin. By doing this, the processing time can be shortened, i.e., comparison of images can be carried out based on two different images; therefore, there is an effect that the detection accuracy may be improved.

BRIEF DESCRIPTION OF THE DRAWINGS

FIG. 1 is a schematic diagram of a coin detecting apparatus in accordance with an embodiment of the present invention.

DETAILED DESCRIPTION OF THE INVENTION

An embodiment of the present invention is explained with reference to the drawing.

In FIG. 1, reference numeral 1 indicates a coin detecting apparatus. The coin detecting apparatus has a light source L for emitting a light beam onto one of two surfaces of a coin 2 inserted via a path (not shown in the drawing). The light source L is, e.g., an LED (Light-Emitting Diode) which is turned off under ordinary conditions, i.e., the light source L is turned on when the insertion of a coin is detected. The light source L may not be limited to LEDs. That is, the light source L may be selected desirably from various light-emitting units.

In addition, a half mirror 3 is provided on the same side of the surface of the coin as the light source L. The light beam reflected on the surface of the coin 2 is transmitted through the half mirror 3. Simultaneously, the light beam reflected on the surface of the coin 2 is reflected on a mirror surface 4 formed on the half mirror 3, so that the direction of the light beam reflected by the mirror surface 4 can be variable by adjusting the angle of the half mirror 3. Also, a full area sensor 5 (i.e., the first image-capturing section) is disposed on an optical axis (as indicated by a dotted line in FIG. 1) of the transmitted light beam transmitted through the half mirror 3, so that the full image of the surface of the coin 2 is captured by the full area sensor 5; and a regional area sensor 6 (i.e., the second image-capturing section) is disposed on an optical axis (as indicated by a line having dots and short lines in FIG. 1) of the light beam reflected by the half mirror 3 so that only a part of the surface of the coin 2 is captured.

A first lens 7 is disposed between the full area sensor 5 and the half mirror 3. In addition, a second lens 8 is disposed between the regional area sensor 6 and the half mirror 3. The first lens 7 condenses the transmitted light beam transmitted through the half mirror 3 onto the full area sensor 5. The second lens 8 condenses the light beam reflected by the half mirror 3 onto the regional area sensor 6. These lenses 7 and 8 have variable magnification ratios.

The full area sensor 5 captures the full image of the surface of the coin 2 (hereinafter simply called the full image) in accordance with the light beam condensed by the first lens 7. On the other hand, the regional area sensor 6 captures a central portion of the surface of the coin 2 in accordance with the light beam condensed by the second lens 8. The regional area sensor 6 is, e.g., an area sensor having higher resolution than the full area sensor 5, so that the regional area sensor 6 can extract images of fine pressed patterns formed on the surface of the coin 2.

The full area sensor 5 and regional area sensor 6 are connected to an image-processing section 9 which carries out the image processing so that the full image captured by the full area sensor 5 and the partial image of the surface of the coin captured by the regional area sensor 6 are output to the image-processing section 9. In the present embodiment, the transmitted light beam transmitted through the half mirror 3 is condensed onto the full area sensor 5 by the first lens 7; and the light beam reflected by the half mirror 3 is condensed onto the regional area sensor 6 by the second lens 8. However, the light beam reflected by the half mirror 3 may be condensed onto the full area sensor 5; and the light beam transmitted through the half mirror 3 may be condensed onto the regional area sensor 6.

The image-processing section 9 is provided with a storage section (not shown in the drawing) for storing a plurality of master images, i.e., the previously captured images with respect to various types of coins. Each master image stored in the storage section is formed of full images corresponding to both sides of each coin; and partial images having high resolution corresponding to central portions of each coin so that the central portion is determined by a predetermined diameter from a center of each coin. That is, the storage section stores the master images having both sides of each of various coins with respect to the same conditions, i.e., resolution and size the same as those of the images captured by the full area sensor 5 and the regional area sensor 6.

In addition, the image-processing section 9 is provided with a comparison section (not shown in the drawing) for comparing a plurality of images stored in the storage section with the images captured by the full area sensor 5 and the regional area sensor 6. The comparison section is formed by a full image comparison section (not shown in the drawing) for comparing the full image input from the full area sensor 5 with the full image previously stored in the storage section; and a partial image comparison section (not shown in the drawing) for comparing the partial image input from the regional area sensor 6 with the partial image previously stored in the storage section. Image processing carried out in the full image comparison section and the partial image comparison section are separate, i.e., the image processings are carried out in parallel.

The full image comparison section carries out various tasks, e.g., fixing the position of the coin 2; specifying the rotation angle of the coin 2; and determining the type of coin, based on the full images captured by the full area sensor 5 and the full images stored in the storage section. The partial image comparison section determines various factors of the surface of the coin 2, e.g., patterns, stamp marks, and other fine marks based on the partial images captured by the regional area sensor 6 with a high resolution; and the partial image previously stored in the storage section with a high resolution. In addition, considering image data handling of central portions of coins, the partial image comparison section can determine various factors, e.g., hole diameter, and fine marks formed on coins having a hole in a center thereof, e.g., a 5 ¥en coin and a 50 ¥en coin.

Next, the operations carried out by the coin detecting apparatus having the above explained structure are explained.

First, the coin 2 is inserted via the path; then light is emitted onto one of two surfaces of the inserted coin 2 from the light source L. The light beam reflected on the surface of the coin is split into a transmitted light beam and a reflected light beam by the half mirror 3. The former, i.e., the transmitted light beam, is condensed onto the full area sensor 5 via the first lens 7, so that the full area sensor 5 captures the full image of the surface of the coin 2.

The image data of the captured full image of the coin 2 are input into the image-processing section 9, so that the full image comparison section can compare the input image data with the full image of the corresponding type of coin previously stored in the storage section. When the coin 2 is inserted via the path, conditions of the inserted coin 2 are arbitrary with respect to, e.g., as to which one of the front surface and the back surface; the type of inserted coin 2; and the rotational angle. Therefore, in addition to the type of each coin and front-or-back surface, it is necessary to prepare full images corresponding to various rotation angles of each coin in order to compare the full images including both surfaces of each type of coin stored in the storage section with the full images captured by the full area sensor 5. In this case, the storage section must have a greater storage capacity. Accordingly, the storage section stores a full image of a front surface of each coin and a full image of a back surface of each coin so that the full image comparison section is capable of: determining as to whether the previously stored full image correlates with the full image received from the full area sensor 5 by rotating the previously stored full image; switching the full image to the other side of the coin if there is not a correlation at every rotation angle; rotating the switched full image; and determining as to whether these full images correlate. If there are not correlations with respect to both surfaces, the full image comparison section switches to the full images of both sides of other types of coins; and determines as to whether there are correlations in the same manner as explained above. The comparisons are carried out by the full image comparison section successively until the full images correlate. When the full image stored in the storage section and the full image captured by the full area sensor 5 correlate, a detection result indicating the type of coin is output from the full image comparison section. If the full image of the inserted coin 2 does not correlate with any one of the full images previously stored in the storage section, the detection result indicates that there is not a master image corresponding to the inserted coin 2.

On the other hand, the latter one, i.e., the reflected light beam, is condensed onto the regional area sensor 6 via the second lens 8 so that the captured and condensed image is a partial image having high resolution corresponding to a central portion of the surface of the coin 2. The image data of the captured partial image is input into the image-processing section 9 so that the partial image comparison section compares the input image data with the partial image stored in the storage section. Data size of the partial image depends on resolution and image area, e.g., the data size increases depending on the resolution. The data size further increases if the image area is significant. Therefore, the resolution of the partial image and the image area are predetermined so that at least images of patterns including pressed marks on a margin section around a central hole of a coin can be captured; and the data size of the captured images is not greater than that of the above-explained full images.

The partial image comparison section receives the partial images from the regional area sensor 6 and determines whether the partial images received from the regional area sensor 6 and the partial images stored in the storage section correlate. In this case, the partial image comparison section determines whether the partial images captured by the regional area sensor 6 and the previously stored partial images correlate by rotating the previously stored partial images similarly to the case of the full image comparison section. If there is not a correlation between the partial images until one session of rotating the previously stored partial image by 360 degrees is completed, the partial image comparison section switches an object to be compared to other image data corresponding to another type of coin previously stored in the storage section; and then, the partial image comparison section repeats the same processes as those carried out by the full image comparison section with respect to surfaces and the switched comparison object.

The full image comparison section and the partial image comparison section compare images in this way. If the output detection results correlate with the full image comparison section and the partial image comparison section, the type of coin is confirmed. On the other hand, if the detection result indicates that either the full image comparison section or the partial image comparison section does not identify the type of inserted coin; or that the type of coin detected by the full image comparison section and the partial image comparison section does not correlate, the detection process is repeated. Otherwise, the detection is completed because the type of coin cannot be identified. In the present embodiment, the storage section stores the full images and the partial images. The storage section may have separate areas, e.g., a storage area for storing the full images and a storage area for storing the partial images. Such a case having separate storage areas is advantageous because transmission of the image data can be efficient, i.e., without requiring a time delay between the full image comparison section and the partial image comparison section and the storage section.

Therefore, according to the above embodiment, the light beam reflected on the surface of the coin 2 is split by the half mirror 3; and the split light beams are input into the full area sensor 5 and the regional area sensor 6. By doing this, the full image of the surface of the coin 2 and the partial image of the surface of the coin 2 can be obtained simultaneously. Therefore, the data size of the image can be further reduced compared with a case in which the full images of the surface of the coin 2 are obtained using two area sensors; thus, the detecting time can be shortened in the above embodiment.

In addition, a magnified image of the central portion of the surface of the coin 2 can be obtained by the regional area sensor 6 while the full images of the surface of the coin 2 can be obtained by the full area sensor 5. Therefore, images of pressed fine patterns formed on the surface of the coin 2 can be extracted; thus, detection accuracy increases.

Furthermore, since the regional area sensor 6 has high resolution, full images of the surface of the coin 2 can be obtained at higher resolution, without increasing the size of the image data, than in a case in which the full images of the surface of the coin 2 are obtained at lower resolution; therefore, detection accuracy with respect to types of coin can be improved without increasing the time necessary for detection.

In addition, since a central portion of the surface of the coin 2 disposed at an arbitrary rotation angle is captured by the regional area sensor 6, the storage section previously stores the central portion of the partial image as a reference image. Therefore, the comparison can be carried out by rotating the previously stored reference images in accordance with the rotation angle of the coin 2. As a result, it is not necessary to prepare partial reference images of the surface of the coin 2 corresponding to the arbitrary rotation angles; thus, it is possible to reduce the volume of previously stored image data in the storage section.

In addition, the full images captured by the full area sensor 5 can be compared with the previously stored full reference images. Simultaneously, the partial images of the surface of the coin 2 captured by the regional area sensor 6 can be compared with the previously stored reference partial images. By doing this, the processing time can be shortened, e.g., comparison of images can be carried out based on two different images; therefore, there is an effect in that detection accuracy may be improved.

The present invention is not limited to the above explained embodiment. That is; other factors, e.g., colors, may be added to objects to be used in the comparison.

Also, the light beam is split with respect to two directions by the half mirror 3 in the above-explained embodiment. However, not less than three area sensors may be disposed so as to divide the light beam into not less than three directions. The regional area sensor used in the above-explained embodiment has high resolution. However, the regional area sensor may have a resolution at approximately the same level as that of the full area sensor, so that only an image of a central portion of the coin is magnified; and such a magnified image is captured by the regional area sensor. In such a case, since the light beam emitted toward the regional area sensor is dispersed, it is preferable that the amount of light emitted from the LEDs increase.

The magnification ratios of the lenses 7 and 8 are variable in the above-explained embodiment. However, the lenses 7 and 8 may have fixed magnification ratios.

What is claimed is:

1. A coin detecting apparatus comprising:

a light source emitting, in use, a light beam onto either of two surfaces of a coin;

a half mirror splitting, in use, the light beam reflected on the surface of the coin into a transmitted light beam and a reflected light beam;

a first image-capturing section obtaining, in use, a full image of the surface of the coin in accordance with one of the transmitted light beam and the reflected light beam;

a second image-capturing section obtaining, in use, an expanded partial image of only a central portion of the surface of the coin in accordance with the other one of the transmitted light beam and the reflected light beam; the second image-capturing section having a higher resolution than that of the first image-capturing section; and an image-processing section which is provided with a storage section configured to store full images corresponding to both sides of each coin and partial images having high resolution corresponding to central portions of each coin, a full image comparison section configured to compare the full image of one of two surfaces of the coin input from the first image-capturing section with the full images previously stored in the storage section by rotating the full images, and a partial image comparison section configured to compare the partial image of the central portion of one of two surface of the coin input from the second image-capturing section with the partial image previously stored in the storage section by rotating the partial images previously stored, wherein the image-processing section determines whether or not comparison results of the full image comparison section and of the partial image comparison section correlate, and confirms a type of coin if the comparison results correlate with the full image comparison section and the partial image comparison section, and the resolution of the partial images and image area of the partial images are predetermined so that at least a rolling of the central portion of the coin is capable of being captured as an image; and the data size of the captured image is not greater than that of the full images.

2. A coin detecting apparatus according to claim 1, wherein the second image-capturing section is a high resolution image-capturing element.

3. A coin detecting apparatus according to claim 1, further comprising a lens disposed between the half mirror and the second image-capturing section.

4. A coin detecting apparatus according to claim 1, wherein the partial image obtained by the second image-capturing section corresponds to an image of a central portion of the coin.

5. A coin detecting apparatus according to claim 1, wherein the image-processing section carries out parallel-image processing with respect to the images obtained by the first image-capturing section and the second image-capturing section.

6. A coin detecting apparatus according to claim 3, further comprising a second lens disposed between the first image-capturing section and the half mirror.

7. A coin detecting apparatus according to claim 1, wherein:

the full image comparison section carries out fixing a position of the coin, specifying a rotation angle of the coin, and determining a type of the coin.

8. A coin detecting apparatus according to claim 1, wherein the partial image comparison section determines patterns, stamp marks, and other fine marks on the surface of the coin.

* * * * *